Sept. 22, 1964          P. CARPIGIANI          3,149,756
MULTI-PISTON DOSING AND DISPENSING COCK
Filed June 21, 1963          3 Sheets-Sheet 2

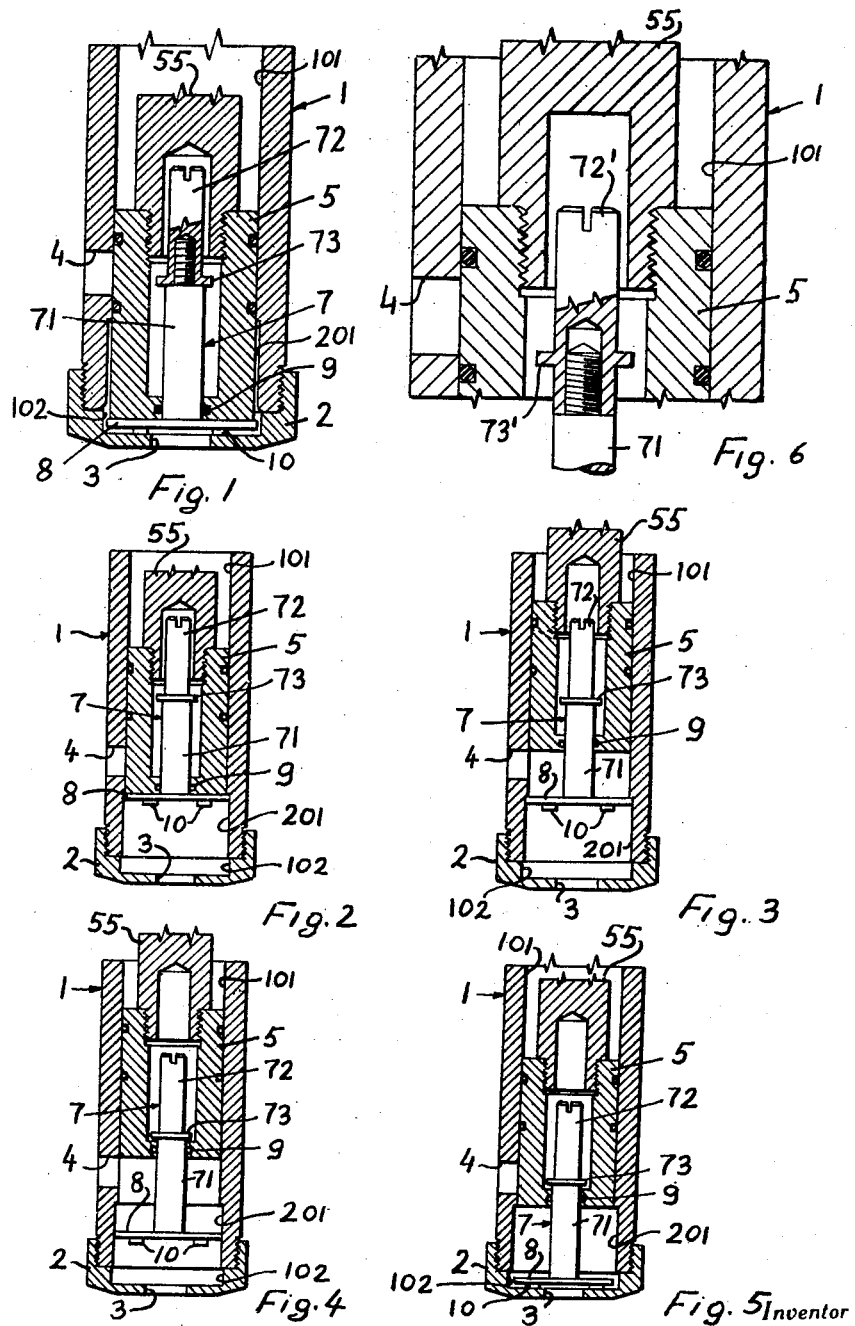

Inventor
POERIO CARPIGIANI
By *Attorneys*

Sept. 22, 1964  P. CARPIGIANI  3,149,756
MULTI-PISTON DOSING AND DISPENSING COCK
Filed June 21, 1963  3 Sheets-Sheet 3

Inventor
POERIO CARPIGIANI
By *Smirie and Smiley*
Attorneys.

United States Patent Office 3,149,756
Patented Sept. 22, 1964

3,149,756
MULTI-PISTON DOSING AND DISPENSING COCK
Poerio Carpigiani, Bologna, Italy, assignor to APAW,
S.A., Fribourg, Switzerland, a corporation of
Switzerland
Filed June 21, 1963, Ser. No. 289,600
Claims priority, application Italy, June 27, 1962,
13,119/62
7 Claims. (Cl. 222—137)

This invention relates to dosing and dispensing devices for ice cream and, if required for ice cream favouring syrups or the like. One of the objects of the invention is to provide a multi-piston dispensing cock, particularly adapted for dispensing exactly measured amounts of ice cream manufactured in the so-called "expresso" ice cream machine.

Another object of the invention, connected with the increasing expansion, in the recent past years, of the ice creams, particularly of machine dispensed ice creams of the so-called "expresso" type, is to provide a dosing and dispensing device for a substantially unflavoured ice cream together with and for flavouring substances. In fact, it is known that a machine for "expresso" ice cream cannot provide for a choice range of ice cream "flavours" as wide as the choice range of the usual ice cream machine. Usually an expresso ice cream machine is adapted to produce a single type of ice cream. It would be too expensive to operate two or three machines, and even in such case, the wide choice range of an ice cream machine of the traditional type, which can offer to consumer's choice, four, five or even more cream "flavours" would still not be met.

It has been already proposed, in order to meet the need of employing "expresso" ice cream machines and the need of providing for a wider choice range of flavours, to make an ice cream paste of a single type, substantially neutral, and to modify its flavour by adding thereto a suitable liquid, syrup or paste. In this manner a sufficiently ample flavour range can be obtained, without multiplying the costs of the plant.

However, the known methods for attaining such result present some inconveniences. In the first place the dispensing and the dosing of the flavouring substance, or syrup, must be effected separately from the dispensing of the ice cream, which needs to be subjected in the cup, to a further mixing of the ice cream and flavour, in order to attain a certain degree of homogenization. This operation is usually neither easy nor simple, particularly when, as is most frequent, the ice cream is served to standing consumers.

In any case, usually, two seperate dosers are required, one for the ice cream and the other one for the syrup.

The present invention has for its object to overcome the above and other inconveniences of the known ice cream dispensing devices, by providing for a dispensing and dosing multi-piston "cock," which permits either the dispensing of an exact quantity of a complete ice cream, or also of simultaneously dosing and dispensing a syrup (or other "flavouring" liquid or paste) and an ice cream, in a single operation, and which provides for a certain homogenization of the two substances which have been thus dispensed.

Other objects and advantages reside in the possibility of adjusting readily the amount of ice cream and, if necessary of the syrup to be dispensed.

Further features and advantages of the present invention will better appear from the following detailed specification of some embodiments of same, chosen by way of example and which will be described with reference to the accompanying drawings, in which:

FIGURES 1 through 5 show in axial section a first embodiment of an ice cream dosing multi-piston cock in different working positions;

FIGURE 6 is an enlarged axial section of a part of the multi-piston cock, showing one of the manners of varying the useful piston stroke;

Figure 6A:
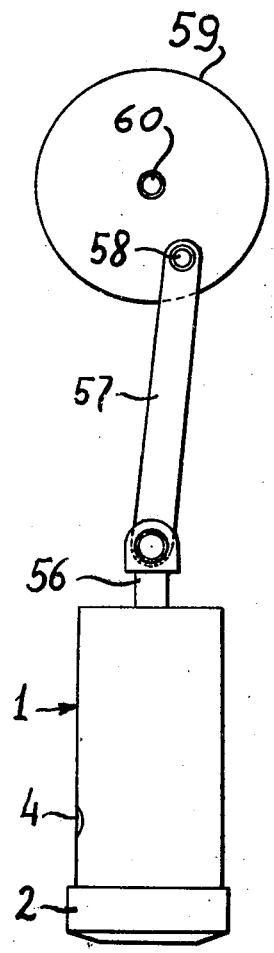
FIG. 6A is a front elevation of the multi-piston cock of FIGURES 1 through 5, and of the means for the actuation of the piston.

Whenever it is desired to distribute in measured amounts only ice cream, without any syrup addition, the multi-piston cock as shown in FIGURES 1 through 5 may be employed.

This consists of a cylinder 1 the bore of which comprises an upper section 101, and a counterbored lower section 207 having a slightly larger diameter than the upper section. The lower end of cylinder 1 is closed by a cap 2, screwed thereon and comprising a bottom provided with a central aperture 3, constituting the ice cream outlet, and a shallow cavity 102 constituting the extension of somewhat greater width of the lower section 201 of the cylinder bore. In the side wall of the upper section 101 of the cylinder, preferably in proximity of the lower end thereof, an ice cream feed port 4 is provided.

In the said cylinder a multiple piston is mounted. This consists of a hollow working piston 5 and a lower washer-like dosing piston 8 mounted co-axially with piston 5.

Working piston 5 is closed at its top by a preferably hollow member 55 screwed into the top thereof and connected to the piston rod 56. Piston rod 56 is articulated at its free end to one end of the connecting rods 57, the second end of which is connected to the crank pin 58 of crank disc 59 keyed on shaft 60 operated by a suitable motor (not shown). Whenever the crank disc is rotated, a reciprocating motion will be imparted to piston rod 56 through crank pin 58 and connecting rod 57. Said working piston 5 is slidably mounted with a tight fit in the upper cylinder section 101 and may project in part, with clearance, into the lower cylinder section 201 and the extension 102.

The dosing piston 8 is slidably mounted with a tight fit in the lower cylinder chamber 201 and may project with clearance in the shallow cavity 102 without obstructing the outlet port 3. For this purpose spacing members, such as the projections 10, are provided for keeping the lower face of the said piston 8 spaced from the bottom of the cap 2 (see FIGURES 1 and 5).

Said dosing piston 8 is provided with a rod 7 which, in the embodiment as shown, comprises a lower section 71 slidably mounted through a bore in the bottom of the hollow working piston 5, said bore being preferably provided with a packing ring 9 in order to ensure a tight fit of said piston rod 7. At the top of rod section 71 a rod extension 72 is detachably mounted, as by screw threads. The rod extension 72 is provided with a projecting abutment collar 73 adapted to abut against the bottom of the said hollow piston 5, while the part above said collar 73 may slide within the cavity of said hollow member 55.

The operation of the just-described device is as follows:

Starting with the cock in closed or rest position (FIGURE 1) when the operating piston 5 is lifted by means of the rod 55, the dosing piston 8, also due to the tight fitting of its rod section 71, is entrained until it reaches the step at the end of the wider cylinder bore 201, where it is stopped (FIGURE 2). The piston 5 continues then its upward stroke and when it uncovers the side port 4 (FIGURE 3) the ice cream is allowed to flow between pistons 5 and 8 and to push the dosing piston 8 down (FIGURE 4) until the collar 73 abuts against the bottom of cylinder 5 (FIGURE 4).

By driving the operating piston 5 downwardly (FIGURE 5), the ice cream dose enclosed between the two coaxial pistons 5 and 8 is first shifted along cylinder bore 201 until projection 10 on piston 8 abuts on cap 2, and thereafter said ice cream is forced through clearance space 102 all around piston 8 and out through the outlet 3, until the two pistons 5 and 8 come close together, as in the starting position (FIGURE 1).

The dose of ice cream may be varied by varying the position of the abutment collar 73 with respect to the stem section 71, which in practice may be effected by substituting the stem section 72 with another stem section 72' (FIGURE 6) having the abutment collar 73' in a different position with respect to collar 73.

Whenever it is desired to distribute at the same time and in the same container a predetermined dose of substantially neutral ice cream and a corresponding dose of flavouring syrup, the just-described device may be modified substantially as shown in FIGURES 7 to 12 of the drawings.

Figure 7:
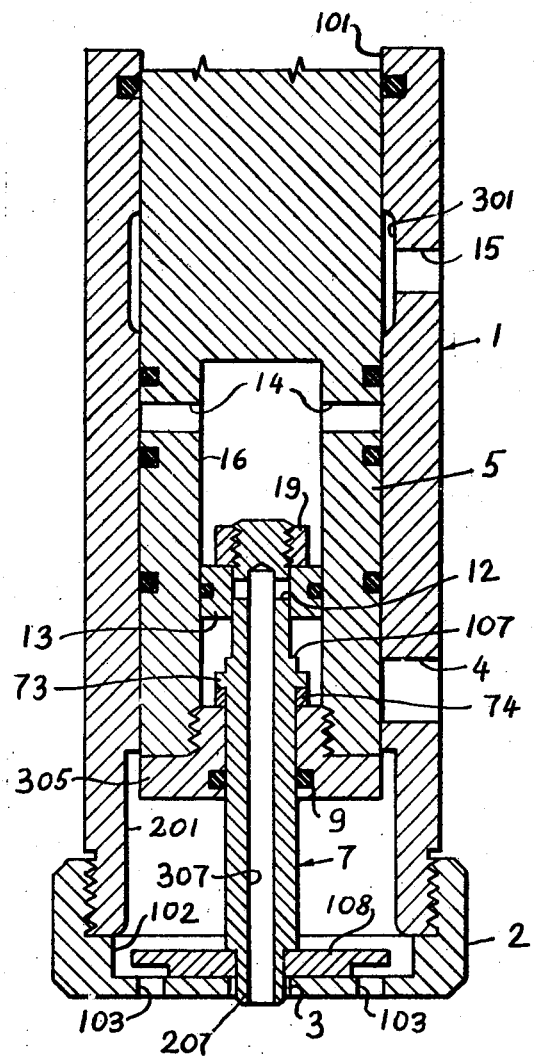
FIGURE 7 is an enlarged axial section through a multi-piston cock adapted for dispensing together exact doses of ice cream and flavouring syrup.

With particular reference to FIGURE 7, in which some parts and clearances have ben exaggerated for better demonstrating the operation of the device, it is seen that the cylinder 1, in addition to the ice cream inlet port 4 is provided with additional upper side port 15 adapted to be connected to a source of flavouring syrup (not shown). The side port 15 opens into an annular groove 301 in the walls of the cylinder 1.

The working piston 5 is hollow, so as to form a cylindrical chamber 16 provided with radial bores 14 which, in suitable positions of said piston 5 open into said annular groove 301 and thus put the chamber 16 into communication with the syrup feed port 15.

The rod 7 which carries the ice cream dosing piston 108 is provided with a bore 307 which is closed at its top and open at its bottom. In proximity of the top end, radial ports 12 are provided in the piston rod 7 which, when they are unobstructed, put into communication the chamber 16 with the axial bore 307. A valve member, which in FIGURE 7 is in the form of a piston 13 slidably mounted between two abutment members 107 and 19, is mounted so as to cover or uncover the ports 12. The rod 7 is further provided with a projecting abutment collar 73 adapted to abut against the bottom end of piston 5 (which, in FIGURE 7 is in the form of an axially bored flanged screw plug 305) or against a washer-like spacing member 74, as shown in FIGURE 7, provided for adjusting the stroke of piston 108 with respect to the bottom end of piston 5.

The ice cream dosing piston 108 is in the form of a plate with an undercut edge and is mounted on the lower, reduced end of the rod 7 which projects beyond the bottom face of said dosing piston and forms a kind of spout which, in the dispensing position of the parts (as in FIGURE 7) comes to be inserted into the central aperture 3 of the cylinder closure cap 2. The cap is additionally provided with a crown of peripheral openings 103 which open under the undercut edges of piston 108.

Figure 8:
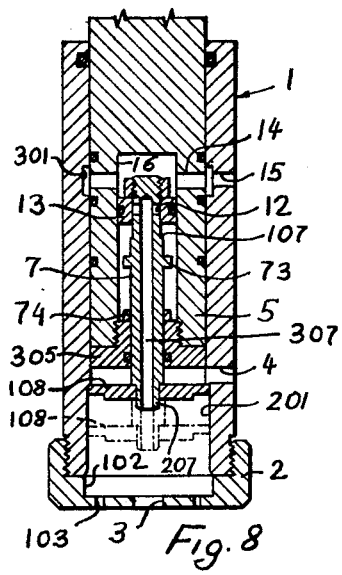
FIGURES 8 and 9 show in axial section and in different working positions a multi-piston cock like that shown in FIGURE 7.
Figure 9:
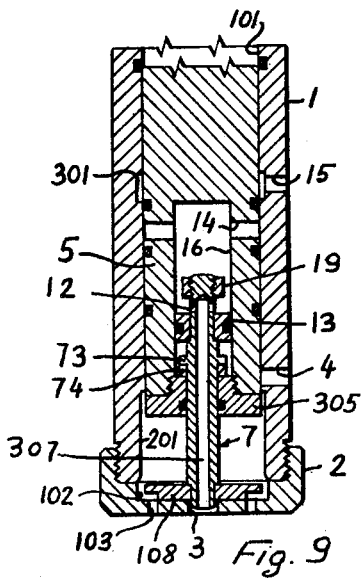
Figure 12:
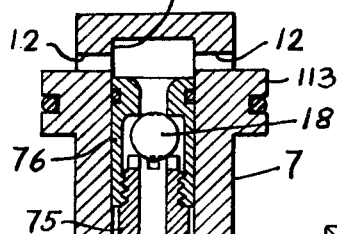
FIGURE 12 shows a variation of the multi-piston cock for distributing both ice cream and a flavouring syrup, and in which the syrup is fed into the cock through a ball valve.

The operation of the just-described device is apparent by considering also the FIGURES 8 and 9.

When piston 5 is shifted so as to bring the parts in the position as shown in FIGURE 8, the ice cream under pressure flows through port 4 and drives piston 108 away from the end of piston 5 and at the same time the syrup flows through port 15, groove 301 and bores 14 into the chamber 16, until the parts assume a position like that shown in dotted lines in FIGURE 8, which position corresponds substantially to that shown in FIGURE 7, but with the dosing piston located near the end of the counterbore, or chamber 201, and ports 15 and 4 still communicating with chambers 16 and 201, respectively.

By further driving piston 5 downwardly, the parts first assume the position as shown in FIGURE 7 and then the piston 5 drives the ice cream filling the space between pistons 5 and 108 around the undercut edges of the dosing piston 108 and through the openings 103 into a container (not shown). At the same time the top of the rod 7 is pushed into the chamber 16 and the piston-like valve 13 is pushed downwardly by the pressure of the syrup entrapped in chamber 16 until the ports 12 are uncovered and the syrup is then allowed to flow through rod bore 307 and is injected through spout 207 into the same container in which the ice cream is being poured (not shown).

This embodiment is particularly adapted to be fitted to ice cream machines in which the piston 5 is hand-operated.

Figure 10:
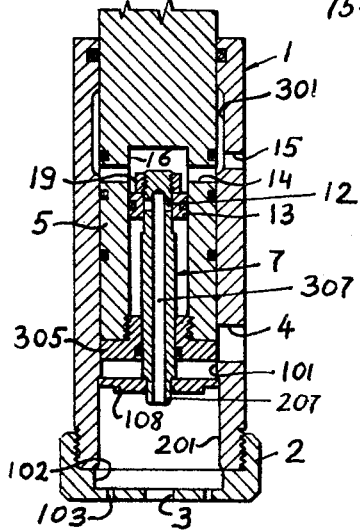
FIGURES 10 and 11 show also in axial section and in two different working positions a third embodiment of multi-piston cock also adapted for dosing both ice cream and a flavouring syrup.
Figure 11:
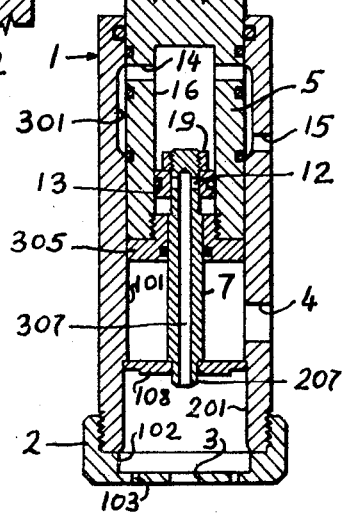

For motor-operated ice cream machines the variation of the embodiment as shown in FIGURES 10 and 11 is more suitable.

In this embodiment, the piston rod 7 is not provided with an abutment collar and the parts are so mounted that after the communication between the port 4 and the chamber 101 (i.e., the chamber above counterbore 201) and the communication between port 15 and chamber 16 are established, the lifting movement of piston 5 is not stopped, but said piston is lifted further for the whole stroke of piston rod 7, as shown in FIGURE 11, and the piston valve 13 slides downwardly in chamber 16, into which syrup is sucked. Upon driving the piston 5 downwardly, when the dosing piston 108 comes into contact with the bottom of cap 2 and the ports 12 come under the groove 301, the piston rod 7 is pushed upwardly into chamber 16 and the piston valve 13 is pushed by the pressure of the syrup entrapped in chamber 16 downwardly, until the ports 12 are uncovered. Upon further driving the piston 5 downwardly, the ice cream is pressed through the crown of holes 103 into a container (not shown) and the syrup is injected through the end of the hollow piston rod 7 into the same container.

Instead of a piston valve 13, other kinds of automatic valves may be employed. Thus in FIGURE 12 a ball valve 18 is shown which is made of a suitable soft slightly deformable material (such as soft India rubber) and is mounted near the top end of piston rod 7 between the castellated top end of a tubular member 75 inserted in rod 7 and a retaining member 76 screwed onto the screw-threaded end of said member 75. This valve permits the flow in a downward direction, but not in an upward direction. Rod 7 is provided with a piston part 113 corresponding to piston 13.

What is claimed is:

1. A multi-piston cock for pasty substances, comprising a cylinder open at its upper end and closed at its bottom end by means of a closure member provided with at least a through bore, said cylinder comprising an upper section, an adjoining middle section having an internal diameter slightly greater than the internal diameter of the upper section, and a lower section provided with means for putting said middle section into communication with said bore in said cylinder closure member, a radial port in said cylinder opening above said middle section, a hollow piston provided with an internal chamber slidably mounted inside said cylinder and reciprocable from a lowermost position in which it rests against the said cylinder closure member to an upper position above said radial port, an axial bore in the bottom of said hollow piston opening at the bottom of said chamber, a piston rod slidably guided through said axial bore into said chamber, abutment means on said rod inside said chamber for limiting the axial movement in one direction of said piston rod by abutment against the bottom of said chamber, a piston-like member secured to said rod outside said chamber and tightly reciprocable inside said cylinder middle section, from a position in which it abuts against said cylinder closure member, and in which it establishes communication between said middle section and the bore on the cylinder closure member, up through the whole middle section of the cylinder, and actuating means for reciprocating said hollow piston inside said cylinder from a lowermost position in which said piston-like member abuts against said cylinder closure member to an upper position in which said hollow piston is lifted above said cylinder radial port.

2. A multi-piston cock for pasty substances, comprising a cylinder open at its upper end, and closed at the opposite end by a closure member provided with at least a through bore, said cylinder comprising an upper section, an adjoining middle section having an internal diameter slightly greater than the internal diameter of the upper section, and a lower section having an internal diameter slightly greater than the internal diameter of the middle section, a radial port in said cylinder opening above said middle section, a hollow piston slidably mounted inside said cylinder and reciprocable from a lowermost position in which it rests against the said cylinder closure member to an upper position above said radial port, a chamber inside said hollow piston, an axial bore in the bottom of said hollow piston opening at the bottom of said chamber, a piston rod slidably guided through said axial bore into said chamber, abutment means on said rod inside said chamber for limiting the axial movement in one direction of said piston rod by abutment aganst the bottom of said chamber, a piston-like member secured to said rod outside said chamber and tightly reciprocable inside said cylinder middle section, from a position in which it abuts against said cylinder closure member up through the whole middle section of the cylinder, projecting means on the head of said piston like member abutting against the said cylinder closure member, and actuating means for reciprocating said hollow piston inside said cylinder from a lower position in which said projecting means abuts against said cylinder closure member to an upper position in which said hollow piston is lifted above said cylinder radial port.

3. A multi-piston cock according to claim 2, in which said piston rod comprises a lower rod section, to which said piston-like member is secured, an upper rod section to which said abutment means are provided, and means for dismountably fastening together said two rod sections.

4. A multi-piston cock according to claim 2, further comprising spacing members inside said chamber of the hollow piston, interposed between the bottom of said chamber and said abutment means on said piston rod.

5. A multi-piston cock for pasty and liquid substances, comprising a cylinder open at its upper end, and closed at its bottom end by a closure member provided with an axial through bore and a crown of peripheral bores, said cylinder comprising an upper section, an adjoining middle section having an internal diameter slightly greater than the internal diameter of the upper section, and a lower section provided with means for putting said middle section in communication with said crown of peripheral bores in said cylinder closure member, a first radial port in said cylinder opening above said middle section, a second radial port in said cylinder opening above said first radial port, a hollow piston slidably mounted inside said cylinder and reciprocable from a lowermost position in which it rests against the said cylinder closure member to an upper position above said first radial port, a cylindrical chamber inside said hollow piston, radial ports in said hollow piston opening into said cylindrical chamber, duct means on said cylinder for putting said second radial port of the cylinder into communication with said radial ports in the hollow piston whenever said hollow piston is reciprocated in said upper position, an axial bore in the bottom of said hollow piston opening at the bottom of said hollow piston chamber, a tubular rod slidably guided through said axial bore into said chamber, nonreturn valve means on said tubular rod, a first piston-like member on said tubular rod inside said hollow piston member and tightly reciprocable inside said chamber from a position in which it abuts against the bottom of said piston chamber to a position below said radical ports of said chamber, a second piston-like member secured to said tubular rod outside said chamber and tightly reciprocable inside said cylinder middle section, from a position in which it abuts against said cylinder closure member, in which it opens the communication between said middle section and the crown of peripheral bores of the cylinder closure member, up through the whole middle section of the cylinder, a spout-like member on the said tubular piston rod, projecting from said second piston like member, and axially aligned with said axial through bore of the said closure member, and actuating means for reciprocating said hollow piston inside said cylinder from a lowermost position in which said second piston-like member abuts against said cylinder closure member to an upper position in which said hollow piston is lifted above said first radial port in said cylinder, and the radial ports of said hollow piston are facing said duct means on said cylinder.

6. A multi-piston cock according to claim 5, further comprising abutment means on said tubular rod coacting with the bottom of said hollow piston chamber for limiting the stroke of said tubular rod.

7. A multi-piston cock according to claim 5, in which said tubular rod is closed at its upper end, and is provided near its upper end with radial bores communicating with the tubular duct inside said rod, and in which the said first piston-like member is mounted reciprocable on the said tubular rod upper end from a position in which it closes said radial bores down to a position in which it clears said bores.

References Cited in the file of this patent

UNITED STATES PATENTS

| 236,096 | Barker | Aug. 22, 1882 |
| 2,440,410 | Leonard | Apr. 27, 1948 |

FOREIGN PATENTS

| 1,113,288 | France | Mar. 26, 1956 |